US012321367B2

(12) United States Patent
Rolle et al.

(10) Patent No.: US 12,321,367 B2
(45) Date of Patent: Jun. 3, 2025

(54) SEMANTIC RESPONDER DEPENDENCIES IN INTEGRATED END OF PURPOSE PROTOCOLS

(71) Applicant: SAP SE, Walldorf (DE)

(72) Inventors: Benny Rolle, Reinhardshagen (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 18/487,347

(22) Filed: Oct. 16, 2023

(65) Prior Publication Data

US 2025/0124051 A1 Apr. 17, 2025

(51) Int. Cl.
*G06F 16/27* (2019.01)

(52) U.S. Cl.
CPC .................. *G06F 16/273* (2019.01)

(58) Field of Classification Search
CPC .................................................... G06F 16/273
See application file for complete search history.

(56) References Cited

U.S. PATENT DOCUMENTS

| | | | |
|---|---|---|---|
| 8,566,193 B2 | 10/2013 | Singh et al. |
| 8,874,551 B2 | 10/2014 | Rosjat et al. |
| 9,149,407 B2 | 10/2015 | Hesse et al. |
| 9,569,869 B2 | 2/2017 | Hesse et al. |
| 9,904,796 B2 | 2/2018 | Pluder et al. |
| 9,996,592 B2 | 6/2018 | Hengstler et al. |
| 10,552,642 B2 | 2/2020 | Rolle et al. |
| 10,839,099 B2 | 11/2020 | Vogel et al. |
| 11,042,654 B2 | 6/2021 | Nos et al. |
| 11,481,513 B2 | 10/2022 | Rolle |
| 11,494,546 B2 | 11/2022 | Rolle |
| 11,514,065 B2 | 11/2022 | Rolle |
| 11,550,781 B2 | 1/2023 | Rolle et al. |
| 11,657,034 B2 | 5/2023 | Rolle |
| 11,714,828 B2 | 8/2023 | Rolle et al. |
| 11,741,237 B2 | 8/2023 | Loch et al. |
| 2014/0172496 A1 | 6/2014 | Rosjat et al. |
| 2014/0364983 A1 | 12/2014 | Bildmayer et al. |

(Continued)

OTHER PUBLICATIONS

U.S. Appl. No. 18/049,063, filed Oct. 24, 2022, Hesse et al.

(Continued)

*Primary Examiner* — Truong V Vo
(74) *Attorney, Agent, or Firm* — Fish & Richardson P.C.

(57) ABSTRACT

The present disclosure involves systems, software, and computer implemented methods for data privacy. One example method includes providing an end-of-purpose query to applications in a landscape that requests an application to determine whether the application is able to block an object. Votes are received from applications that are either a can-block vote that indicates that the application can block the object or a veto vote that indicates that the application cannot block the object. At least one relevant-application veto model is identified that models which applications can raise a relevant veto vote with respect to another application. Received end-of-purpose votes and the relevant-application veto models are evaluated to determine whether any applications should be block instruction recipients. If any block instructions recipients have been identified, a block instruction for the object is set to each block instruction recipient.

20 Claims, 12 Drawing Sheets

(56) References Cited

U.S. PATENT DOCUMENTS

| | | |
|---|---|---|
| 2015/0113459 A1 | 4/2015 | Hengstler et al. |
| 2016/0112438 A1 | 4/2016 | Hengstler et al. |
| 2017/0270163 A1 | 9/2017 | Christoph et al. |
| 2019/0005210 A1 | 1/2019 | Wiederspohn et al. |
| 2019/0018985 A1 | 1/2019 | Rolle et al. |
| 2020/0019728 A1 | 1/2020 | Rolle |
| 2020/0184087 A1 | 6/2020 | Nos et al. |
| 2022/0043917 A1 | 2/2022 | Rolle |
| 2022/0050834 A1 | 2/2022 | Rolle et al. |
| 2022/0277023 A1 | 9/2022 | Rolle et al. |
| 2023/0176894 A1 | 6/2023 | Rolle et al. |
| 2023/0177180 A1 | 6/2023 | Rolle |
| 2023/0177182 A1 | 6/2023 | Rolle et al. |
| 2023/0177183 A1 | 6/2023 | Rolle et al. |
| 2023/0177186 A1 | 6/2023 | Ighoroje et al. |
| 2023/0177187 A1 | 6/2023 | Vogel et al. |
| 2023/0177188 A1 | 6/2023 | Vogel et al. |
| 2023/0177189 A1 | 6/2023 | Ighoroje et al. |
| 2023/0177194 A1 | 6/2023 | Rolle et al. |
| 2023/0177206 A1 | 6/2023 | Rolle et al. |
| 2023/0177213 A1 * | 6/2023 | Rolle .................. G06F 16/113 726/1 |
| 2023/0179602 A1 | 6/2023 | Rolle et al. |
| 2023/0185938 A1 | 6/2023 | Schmidt et al. |
| 2023/0247034 A1 | 8/2023 | Vogel et al. |

OTHER PUBLICATIONS

U.S. Appl. No. 18/073,142, filed Dec. 1, 2022, Rolle.
U.S. Appl. No. 18/073,164, filed Dec. 1, 2022, Rolle et al.
U.S. Appl. No. 18/074,745, filed Dec. 5, 2022, Vogel et al.
U.S. Appl. No. 18/077,476, filed Dec. 8, 2022, Rolle et al.
U.S. Appl. No. 18/077,493, filed Dec. 8, 2022, Rolle et al.
U.S. Appl. No. 18/347,029, filed Jul. 5, 2023, Rolle et al.
U.S. Appl. No. 18/347,065, filed Jul. 5, 2023, Hesse et al.
Sap.com [online], "SAP Master Data Governance" Sep. 2022, retrieved on Oct. 16, 2023, retrieved from URL <https://www.sap.com/products/technology-platform/master-data-governance.html>, 14 pages.
U.S. Appl. No. 18/487,283, Vogel et al., Identifying Forgotten Data Privacy Protocol Relevant Data Objects, filed Oct. 16, 2023, 51 pages.
U.S. Appl. No. 18/487,293, Rolle et al., Automating Handling of Data Subject Requests for Data Privacy Integration Protocols, filed Oct. 16, 2023, 51 pages.
U.S. Appl. No. 18/487,365, Rolle et al., Landscape Reconfiguration Based On Cross-System Data Stocktaking, filed Oct. 16, 2023, 65 pages.

* cited by examiner

|       | APP 1      | APP 2      | APP 3      | APP 4      | APP 5      |
|-------|------------|------------|------------|------------|------------|
| APP 1 | 1<br>608a  | 0          | 0          | 0          | 0          |
| APP 2 | 1<br>602a  | 1<br>610a  | 0          | 0          | 0          |
| APP 3 | 1<br>604a  | 0          | 1<br>612a  | 0          | 0          |
| APP 4 | 1<br>702a  | 0          | 1<br>606a  | 1<br>614a  | 0          |
| APP 5 | 0          | 0          | 0          | 0          | 1<br>616a  |

|   | APP 1 | APP 2 | APP 3 HR SYS | APP 4 SAFETY SYS | APP 5 |
|---|---|---|---|---|---|
| APP 1 | 1 | 1 _808_ | 0 | 0 | 0 _812_ |
| APP 2 | 0 | 1 | 0 | 0 | 1 _810_ |
| APP 3 | 0 | 0 | 1 | 1 _806_ | 0 |
| APP 4 | 0 | 0 | 0 | 1 | 0 |
| APP 5 | 0 | 0 | 0 | 0 | 1 |

MASTER DATA SOURCE MATRIX 802
804
800

FIG. 8

|       | APP 1 | APP 2        | APP 3 | APP 4        | APP 5        |
|-------|-------|--------------|-------|--------------|--------------|
| APP 1 | 1     | 0            | 0     | 0            | 0            |
| APP 2 | 1 808a| 1            | 0     | 0            | 0            |
| APP 3 | 0     | 0            | 1     | 0            | 0            |
| APP 4 | 0     | 0            | 1 806a| 1            | 0            |
| APP 5 | 1 902 | 1 810a       | 0     | 0            | 1            |

FIG. 9

SEMANTIC RESPONDER DEPENDENCIES IN INTEGRATED END OF PURPOSE PROTOCOLS

TECHNICAL FIELD

The present disclosure relates to computer-implemented methods, software, and systems for semantic responder dependencies in integrated end-of-purpose protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for data privacy protocols. An example method includes: determining, in a multi-application landscape that includes multiple applications, to initiate an integrated end-of-purpose protocol for an object; providing, to different applications of the multiple applications, an end-of-purpose query that requests a respective application to determine whether the respective application is able to block the object; receiving, in response to the end-of-purpose query, an end-of-purpose vote from each application of the different applications, wherein each end-of-purpose vote is either a can-block vote that indicates that the application can block the object or a veto vote that indicates that the application cannot block the object; identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application; evaluating received end-of-purpose votes and the at least one relevant-application veto model to determine whether any applications should be block instruction recipients; and if any block instructions recipients have been identified, sending a block instruction for the object to each block instruction recipient.

Implementations can include one or more of the following features. The object can be a master data object. The master data object can represent a data subject. Relevant-application veto models can be represented as matrices or directed graphs. The veto effect model can represent dependencies between applications with respect to replication of transactional data that references master data. The master data source model can represent master data dependencies between applications. Each of the at least one relevant-application veto model can be updated to reflect transitive application dependencies. Determining to initiate the integrated end-of-purpose protocol can include receiving a request to initiate the integrated end-of-purpose protocol from a requesting application that can block the object. Relevant applications can be determined, using the at least one relevant-application veto model, for which a veto vote may be relevant to the requesting application. The end-of-purpose query can be provided to the relevant applications and the requesting application and not to other applications of the multiple applications. Evaluating received end-of-purpose votes and the at least one relevant application veto model can include: determining that a first application can block the object; and determining that no application has provided a relevant veto vote relevant to the first application. Determining whether any applications should be block-instruction recipients can include identifying the first application as a block-instruction recipient for the object based on the first application being able to block the object and no applications having provided a relevant veto vote relevant to the first application. Sending a block instruction for the object to each block instruction recipient can include sending the block instruction to the first application. The first application can be identified as a block instruction recipient for the object after a second application has provided a veto vote that is not relevant to the first application. Evaluating the received end-of-purpose votes and the master data source model can include: identifying a veto vote for a first master data object received by a first application; and determining that the first veto vote is relevant to a second application in that the first application is requesting the second application to not physically destroy the first master data object. The second application can be identified as a block instruction recipient. The second application can be configured to prevent physical destruction of the first master data object for at least as long as the first application continues to provide a veto vote for the first master data object. The first master data object can be updated while in a blocked state based on at least one update provided by a user authorized to update blocked objects in the second application. An updated version of the first master data object can be replicated from the second application to the first application.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 7 illustrates an adjusted veto effect matrix.

FIG. 8 illustrates an example master data source matrix.

FIG. 9 illustrates an example adjusted master data source matrix.

DETAILED DESCRIPTION

Figure 1:
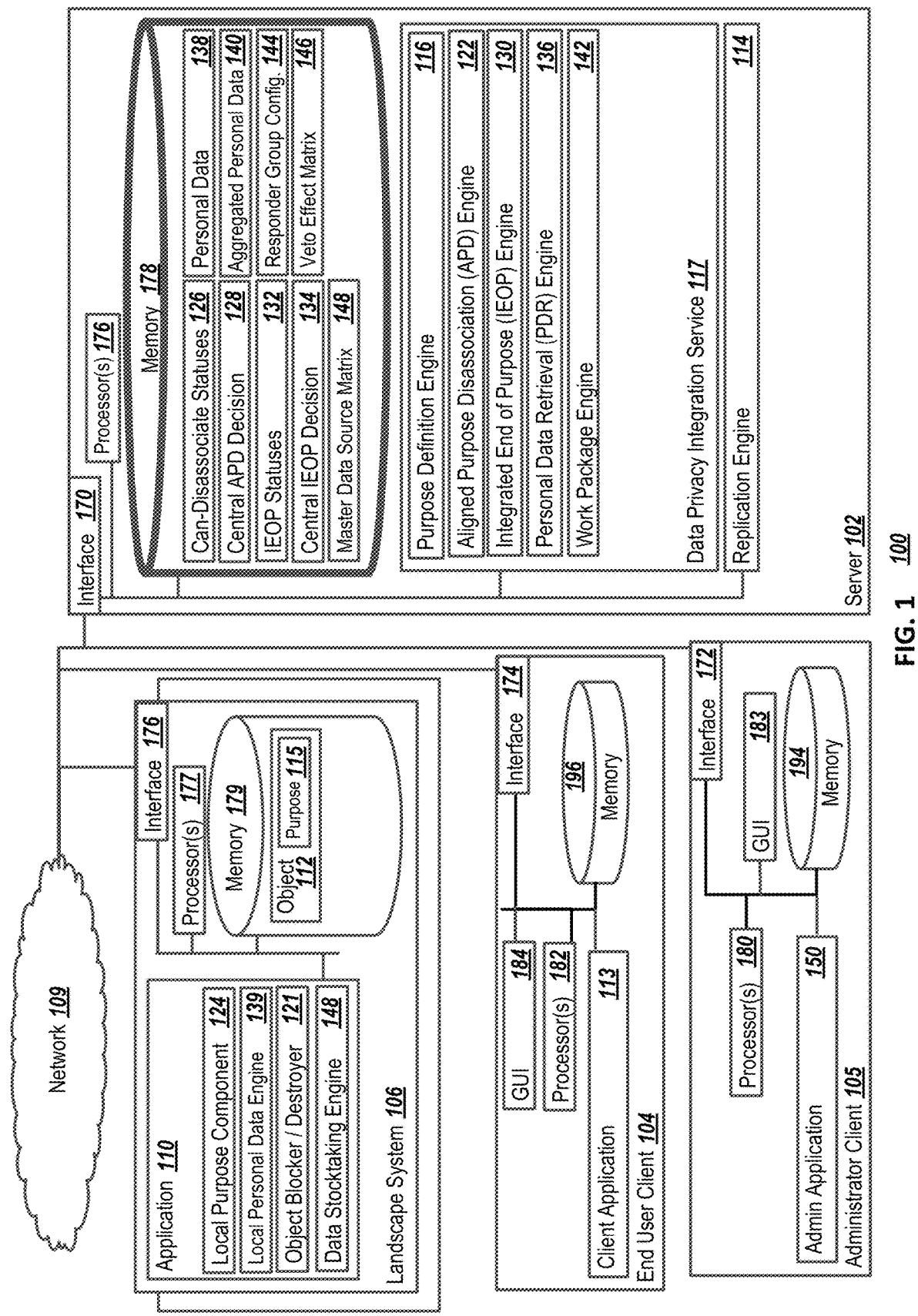
FIG. 1 is a block diagram illustrating an example system for semantic responder dependencies in integrated end-of-purpose protocols.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block operation in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which is hereby incorporated by reference.

Although the iEoP protocol can be used to enable software applications in a landscape to align with each other regarding whether a master data object present in multiple application is to be blocked, the iEoP protocol can in some cases result in under-blocking. For example, suppose a landscape has first, second, third and fourth applications, that the first application is involved in a first process only with the second application where the second application is subsequent to the first application in terms of transactional data replication, and that the first process has completed. For instance, the first application may be involved with order handling and the second application may be involved in calculating financials. Suppose also that the second application is also involved in a second process that also involves the third application and the fourth application, and that the second process is ongoing. In this situation, master data may be able to be deleted in the first application (e.g., if the first application considers a master data object as to be blocked considering local circumstances). However, if the iEoP protocol is used to determine whether the master data object can be blocked, the second, third, and/or fourth applications may provide a veto vote against blocking. Accordingly, the master data object would not be deleted (or blocked) in the first application based on the iEoP result. Master data being maintained in the first application might violate data privacy regulations in some cases.

In summary of the above scenario, with respect to the first application and the master data object: there are no applications subsequent to the first application in processing that perform any actions that might lead to the replication of transactional documents to or creation of transactional documents within the first application. Accordingly, the master data object may be able to be blocked in the first application. However, if there is any other application that relies on the first application for resolving a master data object pointer (e.g., a master data object identifier), then the first application should not block the master data object.

For instance, an organization may use an environmental health and safety system to store information about employee exposures to potentially hazardous materials. Such a system may have particular long retention periods (e.g., twenty years) since a health effect from an exposure may not manifest for many years after the exposure. The environmental health and safety system may store employee identifiers and exposure information (e.g., while not storing full employee information such as employee name, employee address, employee phone number, etc.). A human resources system may be able to map an employee identifier included in the environmental health and safety system to name, address, and contact information for the employee (who may be a former employee). Accordingly, the human resources system should not delete employee master data for employees who have an employee identifier stored in the environmental health and safety system.

The solution described herein can provide an enhancement to the iEoP protocol to ensure that master data objects are blocked within specific applications, without impacting data integrity in other applications, if a process no longer requires these objects being present within these specific applications, even though other applications in the same software landscape still require the object for other processes (and would therefore normally raise a veto against landscape-wide blocking). For example, the technical solution can solve under-blocking by using semantic dependencies between applications that are based on data replication rules, data dependencies, and actual application processing. Technical details of the solution are described in detail below.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118.

In some cases and as described in more detail below, a purpose 118 can be associated with data categories 120. An administrator can assign one or more data categories 120 to a purpose 118 to specify which of potentially different attribute sets stored for a data object can be used when data for the purpose 118 is processed. As described in more detail below, a purpose 118 may exist in a purpose hierarchy and may have one or more dependent purposes. Dependent purposes may represent complementary purposes that can allow a more granular differentiation of data protection measures such as different retention and deletion rules (and other aspects), as compared to a parent purpose. For instance, a parent purpose such as contractual pay for employee work may have a dependent purpose such as tax audit. Processing under the tax audit dependent purpose may use a subset of data (e.g., a subset of data categories) than used for the parent contractual pay purpose and may have a longer retention period. Accordingly, the object blocker/destroyer can destroy object data (e.g., portions of object data) at different times according to different retention periods as configured for different purposes in a purpose hierarchy.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can be performed in the landscape system 106, as described in more detail below. As described herein, "landscape system", "system", and "application" are generally used synonymously, as different participants in a multiple-application landscape that can participate in data privacy integration protocols and other cross system/cross application processing.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned disassociation approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End-of-purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval (PDR) engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

As described above, use of the iEoP protocol might lead to under-blocking in some cases. For instance, under-blocking can occur when a responder system could objectively block an object already, but due to a certain iEoP outcome (e.g., that at least one other responder system raised a veto), the system is not allowed to block the object according to the iEoP protocol. As an enhancement to the iEoP protocol, the iEoP engine 130 can refer to one or more models that model which systems/applications may provide relative vetoes with respect to other systems/applications, and use that information, in some cases, to send block instructions to landscape system(s) 106 even if a non-relevant system/application has raised a veto.

For example, the iEoP engine 130 can use a veto effect matrix 146 that models which systems/applications replicate transactional data to other systems/applications and/or a master data source matrix 148 that models which systems/applications refer to master data in another system/application. The veto effect matrix 146 and the master data source matrix 148 can be configured by an administrator using an administrative application 150, for example. Evaluation and use of these matrices is described in more detail below. Use of the matrices can result in cases where systems/applications block objects faster as compared to non-enhanced iEoP solutions, because vetoes not relevant for a landscape system 106 do not prevent the landscape system 106 from blocking an object.

In some cases, population and maintenance of the veto effect matrix 146 and/or the master data source matrix 148 is performed using the replication engine 114. The replication engine 114 can include, for example, master data integration (e.g., replication of master data) based on master data orchestration (e.g., configuration information specifying from which application(s) master data should be replicated to other applications). In some cases, an initial master data source matrix 148 is populated using information provided by the replication engine 114 (with possible adjustment by an administrator). As another example, the replication engine 114 can send notifications (e.g., to an administrator in the administrative application 150 or as a data message to the iEoP engine 130) if master data distribution rules or patterns have changed, since such changes may mean that the master data source matrix 148 may be out of date. Such a notification by the replication 114 may, for example, result in just informing the administrator to enable the administrator to perform an action (e.g., review and revise the matrix). In other instances, such a notification may result in temporary deactivation of the enhanced iEoP service by the iEoP engine 130, so that an administrator can manually confirm the matrixes and activate the iEoP protocol again only after confirming matrix correctness (e.g., to prevent data loss/data inconsistency).

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 150, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
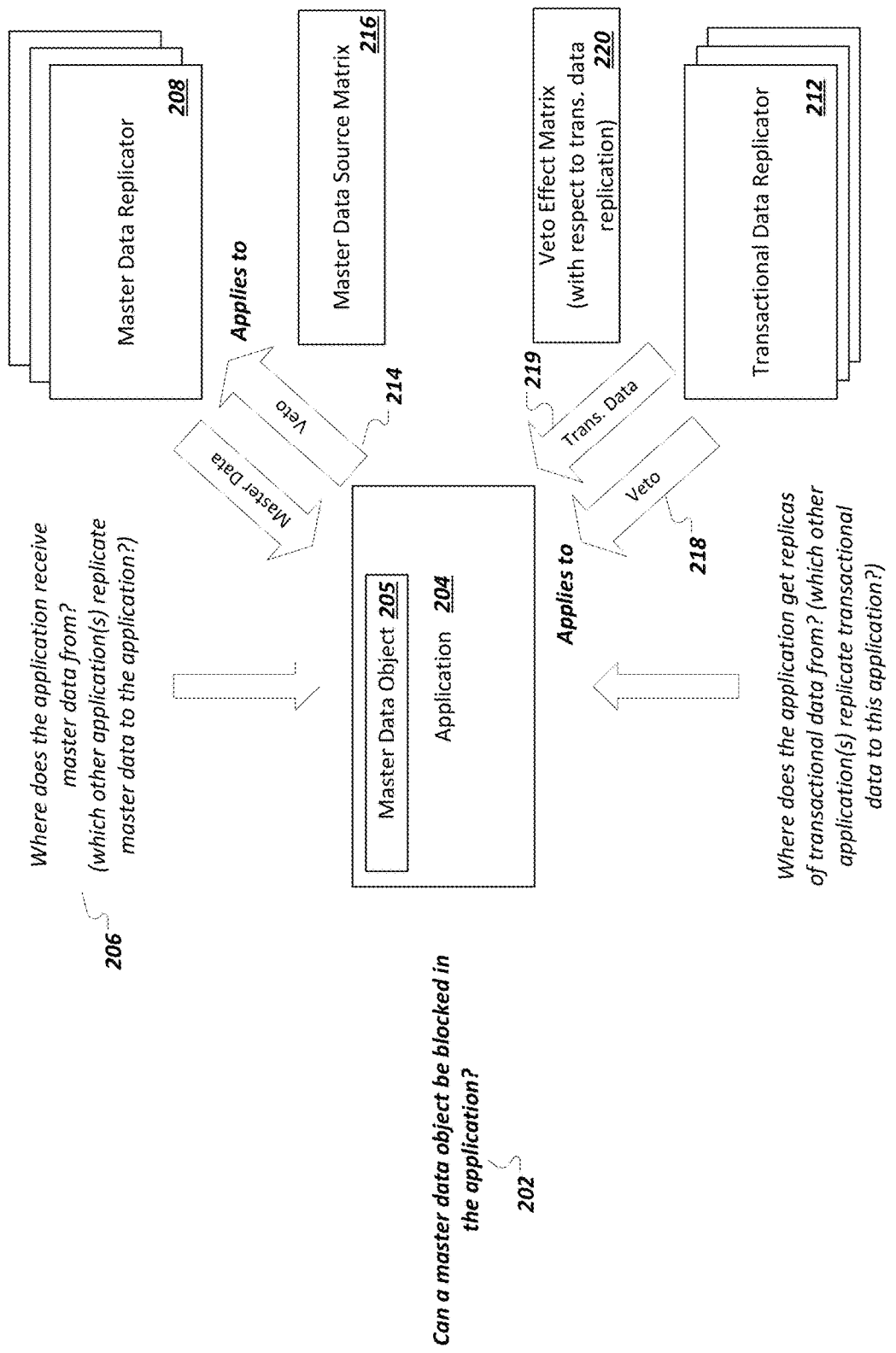
FIG. 2 illustrates an example system illustrating an enhancement to an integrated end-of-purpose protocol.

FIG. 2 illustrates an example system 200 illustrating an enhancement to the iEoP protocol. As part of iEoP processing, a question 202 can be posed (e.g., considered) by a DPI service for an application 204 regarding whether a master data object 205 can be blocked in the application 204. Relevant to the question 202 are a sub-question 206 of where the application 204 receives master data (of the type of the master data object 205) from. That is, the sub-question 206 asks which applications such as master data replicators 208 replicate master data to the application 204. Also relevant to the question 202 is a sub-question 210 of where the application 204 gets replicas of transactional data from. That is, the sub-question 210 asks which applications such as transactional data replicators 212 replicate transactional data (that references the master data object 205) to the application 204.

With respect to iEoP vetoes, a veto by the application 204 (e.g., a veto 214) may be deemed directed towards (e.g., relevant for) the master data replicators 208 of the application 204 (e.g., per object type). Such information can be represented, as described in more detail below, in a master data source matrix 216. The DPI service can use the master data source matrix to answer the sub-question 206, during iEoP processing. As an example, the application may be configured such that master data is not created using the application 204, and the application 204 therefore relies on at least one master data replicator 208 to receive master data. Accordingly, if the application 204 raises a veto regarding the master data object 205 (e.g., because the application 204 is still using the master data object 205), the master data replicators 208 of the application 204 should adhere to the veto and not block the master data object in their respective applications. If a master data replicator 208 did block the object, then the application 204 might not have any source for updates to the master data object 205, for example.

With respect to iEoP vetoes from transactional data replicators 212 (e.g., a veto 218), such vetoes can be deemed relevant for applications such as the application 204 that receive transactional data from the transactional data replicator 212. For instance, a transactional data replicator 212 can create transactional data 219 and replicate the transactional data 219 to the application 204. If the transactional data replicator 212 raises the veto regarding their copy of the master data object, the application 204 should adhere to the veto and not block the master data object 205, because otherwise the application 204 may receive subsequent transactional data 219 after blocking the master data object 205 and the application 204 would no longer be able to use the master data object 205 to identify master data object details related to a master data object identifier of the master data object 205 included in the new transactional data 219. As described in more detail below, veto effects with respect to transactional data replication can be modeled using a veto effect matrix 220. The DPI service can use the veto effect matrix 220 to answer the sub-question 210, during iEoP processing.

Although illustrated as separate boxes, in some cases, a given application may be both a master data replicator 208 and a transactional data replicator 212. For example, in a process with a first application and a second application, the first application may be used for obtaining master data (e.g., data subject name, address, contact information) and also transactional data (e.g., orders). Both the master data and transactional data obtained by the first application may be replicated to the second application. As such, the first application is both a master data replicator 208 and a transactional data replicator 212 with respect to the second application.

Figure 3:
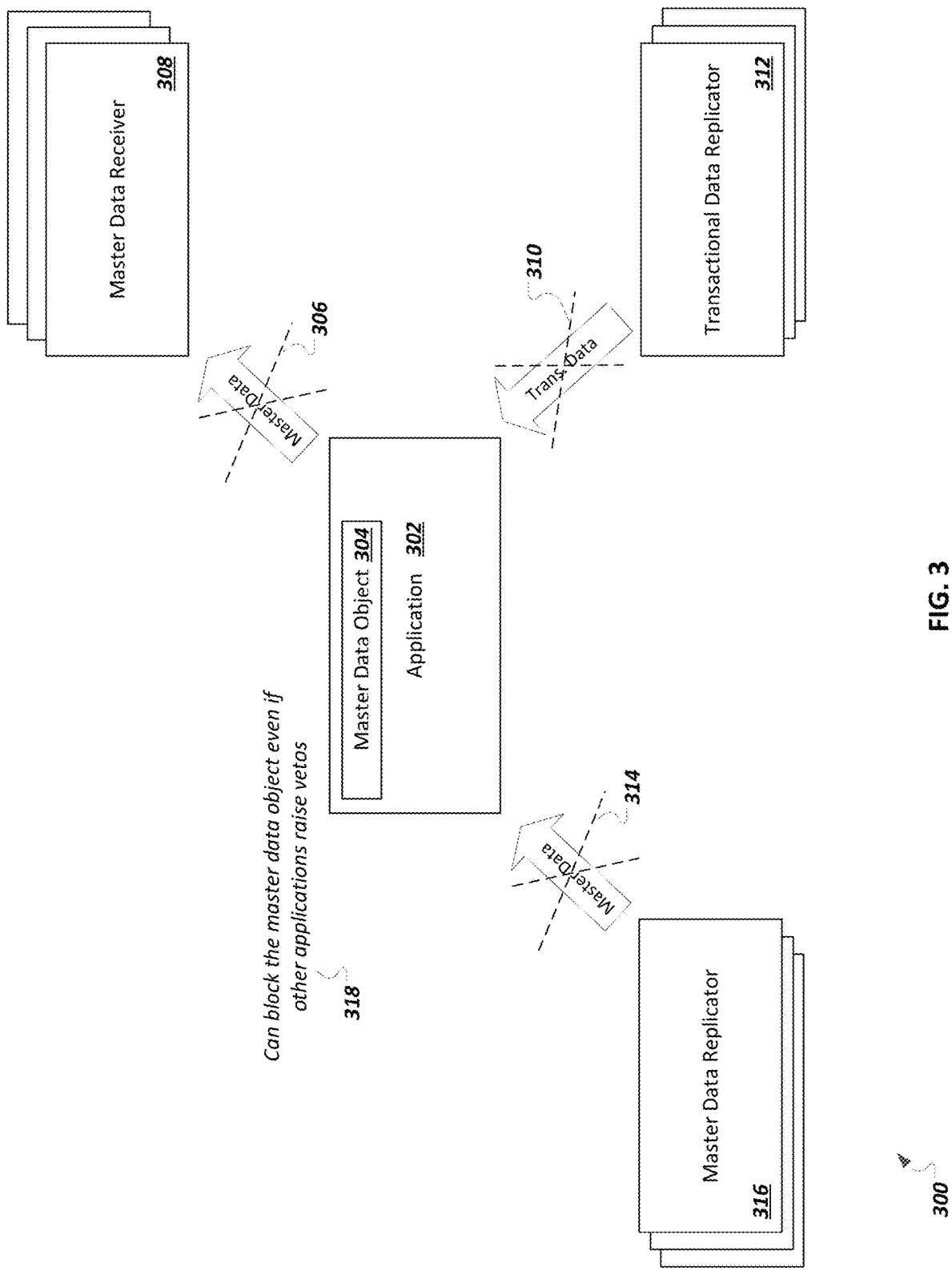
FIG. 3 illustrates an example system in which an application can block a master data object despite at least one veto from another application.

FIG. 3 illustrates an example system 300 in which an application 302 can block a master data object 304 despite at least one veto from another application. As indicated by a symbol 306, the application 302 does not replicate master data (of the type of the master data object 304) to other systems (e.g., to any master data receivers 308). As indicated by a symbol 310, the application 302 does not receive transactional data (referencing the master data object 304) from any transactional data replicators 312. As indicated by a symbol 314, the application does not receive master data from any master data replicators 316.

Accordingly, and as indicated in a note 318, the application 302 can block the master data object 304 even if one or more other applications have raised in iEoP veto for the master data object. That is, if the application 302 considers that the master data object 304 is to be blocked as part of execution of the iEoP protocol, vetoes of other applications should not prevent the application 302 from blocking the master data object 304, because there is essentially no reason to keep the master data object 304 in an unblocked state. The application 302 no longer needs the master data object 304, no other application relies on the application 302 for replication of the master data object, no transactional data replicators will send (after blocking of the master data object 304) transactional data that references the master data object 304, and no master data replicators 316 will send another copy of the master data object 304 to the application 302. The application 302 may have confusing or unknown behavior if a master data replicator 316 sends another copy of the master data object 304 to the application 302 after the application 302 has determined to block/delete and has deleted the object already, for example.

Figure 4:
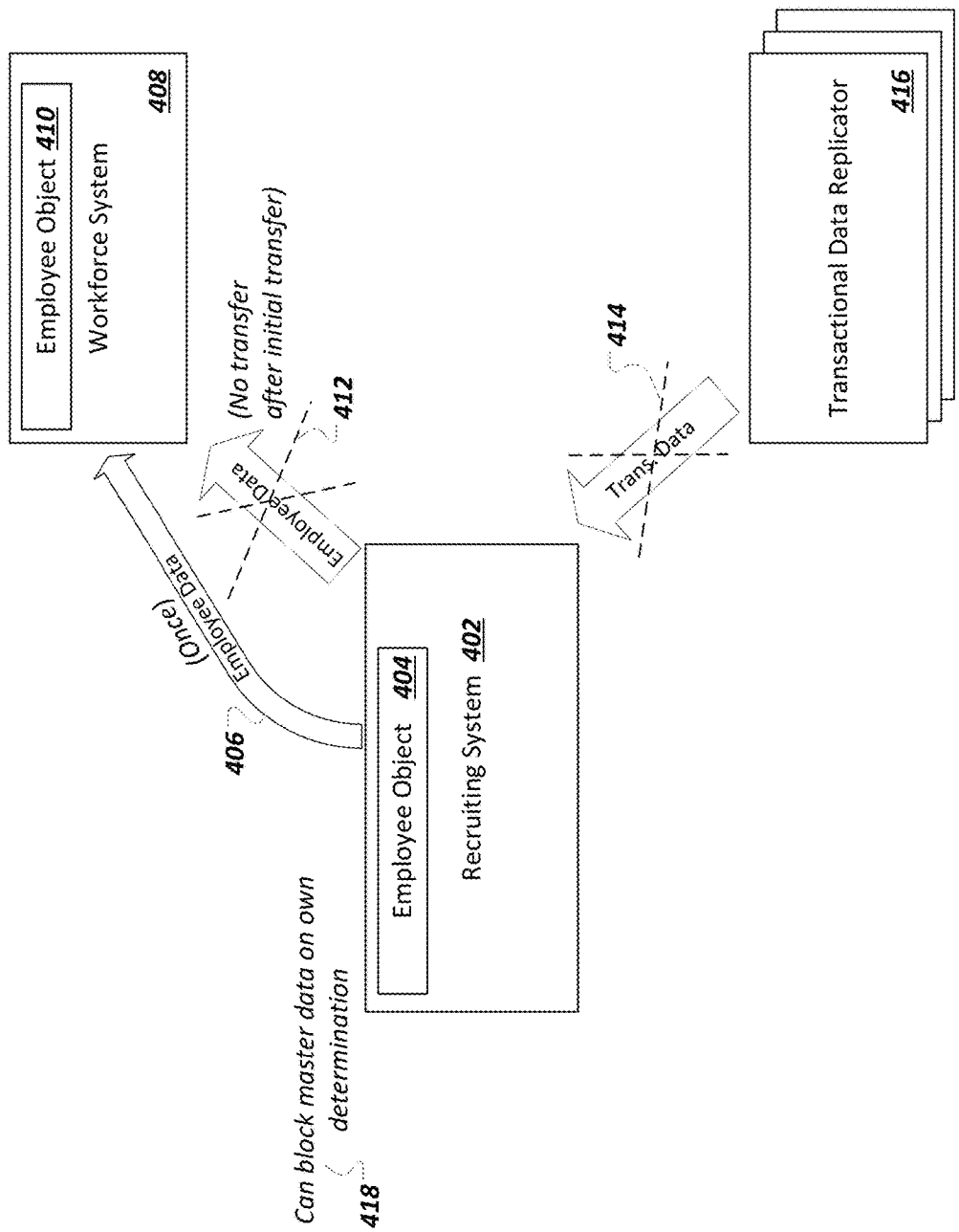
FIG. 4 illustrates an example system depicting an example human resources scenario.

FIG. 4 illustrates an example system 400 depicting an example human resources scenario. In the example human resources scenario, a recruiting system 402 may collect personal data for a candidate employee. If the candidate employee is hired, the recruiting system 402 may represent the candidate employee as an employee object 404 in the recruiting system 402. The recruiting system 402 can, as a one-time transfer (e.g., as illustrated by an arrow 406), transfer the employee object 404 a workforce system 408. The workforce system 408 can store the received object as an employee object 410, and the employee object 410 may represent the employee in the workforce system 408. As indicated by a symbol 412, the recruiting system 402 does not transfer any employee data for a given employee after a first initial transfer of employee data (e.g., to the workforce system 408 or to any other system). As illustrated by a symbol 414, the recruiting system 402 does not receive any transactional data regarding employees (or candidate employees) from a transactional data replicators 416. As indicated by a note 418, the recruiting system 402 can block and delete the employee object 404 according to local residence and retention periods of the recruiting system 402, respectively. The recruiting system 402 may retain the employee object 404 and internal transactional information for the employee object 404 for a certain period of time to support an audit or litigation of hiring practices, for example. Vetoes of other applications for the employee object should not prevent the recruiting system 402 from blocking the object.

Figure 5:
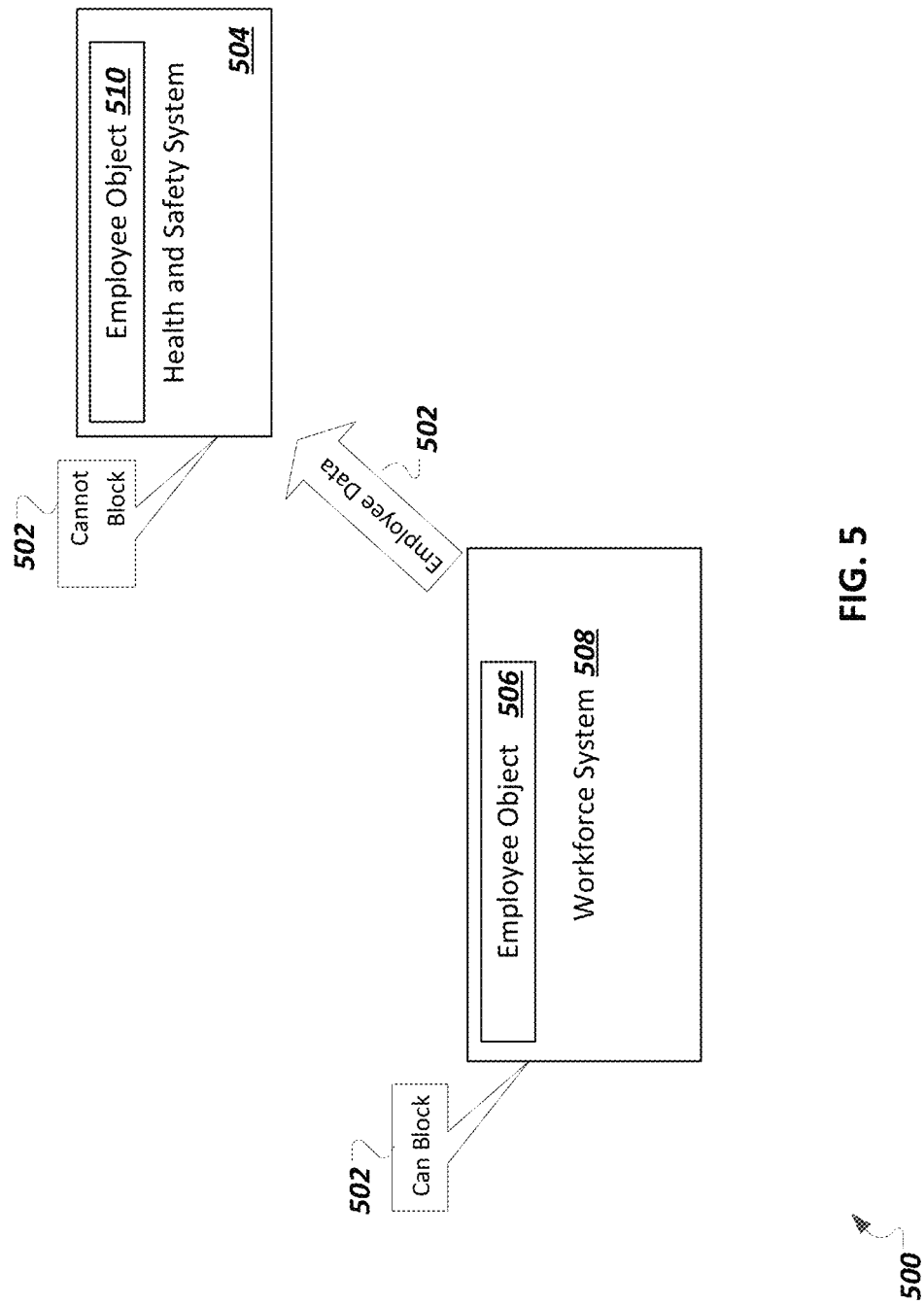
FIG. 5 illustrates an example system for another example human resources scenario.

FIG. 5 illustrates an example system 500 for another example human resources scenario. As illustrated by an arrow 502, a health and safety system 504 may receive a copy of an employee object 506 from a workforce system 508, to be stored in the health and safety system 504 as an employee object 510. During a run of the iEoP protocol for the employee object, the workforce system 508 can provide a can-block vote 512 and the health and safety system 504 can provide a cannot-block veto vote 514. In this example, the workforce system 508 should not block the employee object 506.

The health and safety system 504 may rely on the workforce system 508 to receive updates to the employee object 510, for example. Relevant to an earlier discussed example, if the health and safety system 504 received just an employee object identifier (rather than a fully employee object) from the workforce system 508, the workforce system 508 should still not block the employee object 506, since the health and safety system would need to rely on the workforce system 508 to resolve the master data pointer (e.g., the employee object identifier) to actual master data (e.g., actual employee data such as employee name and contact information). Although blocking prevention is described, in some implementations, the workforce system 508 may be allowed to block but not destruct an object, if an authorized person or automated component could view blocked data in order to provide employee details related to health and safety records in the health and safety system, for example.

Figure 6:
FIG. 6 illustrates an example veto effect matrix.

FIG. 6 illustrates an example veto effect matrix 600. The veto effect matrix 600 can model which systems replicate transactional data to which other systems. Although a matrix is illustrated, other types of models, such as directed graphs, can be used. The veto effect matrix 600 includes a row and column for each landscape application. For instance, the veto effect matrix 600 includes a row and column for five example applications (e.g., App1, App2, App3, App4, App5). For a row for a given application, a value of one in the row for a cell for other applications can indicate that the application replicates transactional data to the other application. For example, values of one in cells 602 and 604 indicate that App1 replicates transactional data to App2 and App3, respectively. As another example, a value of one in a cell 606 indicates that App3 replicates transactional data to App4.

The values in the row for App1 represent a cross-application scenario in which process(es) that start in App1 replicate transactional data to App2 and App3. App2 and App3, therefore should not block master data (e.g., currently residing in App2 or App3, respectively) that could potentially be referenced by the transactional data received from App1. App1 reserves a right to start new processes with references to master data objects and therefore those master data objects should be present in App2 and App3 if transactional data replicated to App2 or App3 reference the master data object. Accordingly, the iEoP protocol should proceed such that if App1 raises a veto for an object, App2 and App3 do not block that object. The veto effect matrix 600, therefore, is "forward directed" in that the veto effect matrix 600 represents that applications can prevent other applications subsequent in multiple-application processes from blocking objects.

The veto effect matrix 600 includes values of one in cells 608, 610, 612, 614, and 616 that lie on a "diagonal" of the veto effect matrix 600 (e.g., where the application for the row matches the application for the column). These values of one can represent that if an application raises a veto for an object that application should not block the object.

The veto effect matrix 600 may be adjusted, before being evaluated, to incorporate a transitive nature of veto effects, as described below (or as another example, transitive effects may be considered during evaluation of the veto effect matrix 600 itself). For example and as described below with respect to FIG. 7, a value of zero in a cell 618 can be adjusted. Veto effect matrix evaluation in general is described in more detail below with respect to FIG. 7.

FIG. 7 illustrates an adjusted veto effect matrix 700. Cells 602-616a in FIG. 7 correspond to cells 602-616 in FIG. 6, respectively. The adjusted veto effect matrix 700 is a version of the veto effect matrix 600 that has been adjusted to reflect a transitive nature of veto effects. For instance, a value of one in a cell 702 reflects a transitive application of veto effects. A prior value of zero for the corresponding cell 618 in the veto effect matrix 600 indicated that App1 did not prevent App4 from blocking. However, the combination of App1 preventing App3 from blocking (as indicated by the value of one in the cell 604a) and App3 preventing App4 from blocking (as indicated by the value of one in the cell 606a) has an effective result of App1 preventing App4 from blocking (as indicated by the value of one in the cell 702). The adjusted veto effect matrix 700 can be generated in real time as needed, or a veto effect matrix may adjust automatically as entries are entered during configuration by an administrator, to reflect transitive veto effects.

At runtime of the iEoP protocol, the veto effect matrix 700 can be interpreted column wise to improve iEoP processing. If a particular application has not itself raised a veto for an object, the column of the veto effect matrix 700 for that application can be evaluated to determine whether vetoes of any other applications are relevant for that application (e.g., where a relevant veto would prevent the application from blocking the object). As a reminder, a value of one in the application's column for a cell corresponding to another application indicates that the other application's veto is relevant for the application. Regarding App1, there are no values of one in any cell of another application, so if App1 does not raise a veto, App1 could block an object (and accordingly, a DPI service can send a block instruction to App1 even if one or more of App2, App3, App4, or App5 have raised a veto for the object). Regarding App2, based on the value of one in the cell 602a, if App2 has not raised a veto for an object but App1 has raised a veto, App2 should not block the object. However, if neither App2 nor App1 has raised a veto but App3, App4, or App5 have raised a veto, App2 could block the object. Regarding App3, only App1 would prevent App3 from being able to block an object (e.g., based on the value of one in the cell 604a). For App4, App1 and App3 could prevent App4 from blocking an object (e.g., based on the values of one in the cell 702 and the cell 606a, respectively). Similar to App1, App5 is not prevented from blocking an object by any other application, since there are no values of one in the column for App5 for any other application.

As a first particular example, suppose that App1, App3, and App5 vote that they can block an object but App2 and App4 vote that they cannot block an object. Even though there is no can-block consensus, a DPI service can evaluate the votes and the veto effect matrix to determine whether a block instruction can still be sent to an application. App1's vote was can-block, and no other application prevents App1 from blocking, so the DPI service can send a block instruction to App1. App2 voted cannot-block, so no block instruction is sent. App3 voted can-block, and the only other application that could prevent App3 from blocking is App1, but App1 did not raise a veto, so the DPI service can send a block instruction to App3. App4 voted cannot-block so does not receive a block instruction. App5 voted can-block, and as discussed above, no other application can prevent App5 from blocking so the DPI service can send a block instruction to App5.

As a second example, suppose that App1 and App2 vote that they cannot block an object but that App3, App4, and App5 vote that they can block an object. App1 and App2 cannot block so do not receive block instructions. App3 and App4 can each block the object but App1's veto prevents both App3 and App4 from blocking, so no block instruction is sent to either App3 or App4. As before, App5 voted can-block and no other application can prevent App5 from blocking so the DPI service can send a block instruction to App5.

In some implementations, when a specific application can and wants to block an object and acts, as a requester, by creating a ticket for the object, the DPI service can optimize which applications receive the ticket. For instance, the DPI service can evaluate the veto effect matrix 700 and select as responders only those applications that could raise a relevant veto for the requester. For instance, if App4 creates a ticket, then App1 and App3 can be responders for the ticket. App4 can also be a responder for the ticket (e.g., in case App4, who may be able to block the object when requesting the ticket, gets new transactional data in the meantime and can no longer block the object).

FIG. 8 illustrates an example master data source matrix 800. Like veto source matrices, the master data source matrix 800 has a row and a column for each landscape application. The master data source matrix 800 can be used to record, for each application, which other applications should keep master data because the application refers to the other application's master data. For example, a column can be populated for App3 802, which can be, for example, a human resources system. A column can also be populated for App4 804, which can be, for example, a health and safety system. A value of one in a cell 806 for App3 802 in the column for App4 804 can indicate that App4 804 refers to, or depends on, master data in App3 802. For instance, App4 804 can store employee identifiers of employees who have had exposure to chemicals and can rely on App3 802 for employee details such as employee name and contact information.

As another example, a value of one in a cell 808 for App1 in the column for App2 can indicate that App2 refers to, or depends on, master data in App1. Similarly, a value of one in a cell 810 for App2 in the column for App5 can indicate that App5 refers to, or depends on, master data in App2.

Dependencies expressed in the master data source matrix 800 can indicate which application vetoes are relevant for another application. For instance, if App3 wants to block a master data object, then App4 should be a responder, and if App4 raises a veto, App3 should not block the master data object. Similarly, App1 should not block a master data object if App2 raises a veto and App2 should not block an object if App5 raises a veto. The master data source matrix 800 can be considered "backward-directed" because an application can raise a relevant veto if an earlier application (that sits earlier in a process chain) would like to block a master data object, based on the application not being able to itself block the object and due to its dependency on the earlier application.

Similar to adjustments to veto source matrices due to transitive aspects, master data source matrices can be adjusted, before use, to reflect dependency chains. For example and as described in more detail below with respect to FIG. 9, a value of zero in a cell 812 can be adjusted to reflect interdependencies between App1, App2, and App5.

FIG. 9 illustrates an example adjusted master data source matrix 900. Cells 806a, 808a, and 810a in FIG. 9 correspond to cells 806, 808, and 810 in FIG. 8, respectively. As described above with respect to FIG. 8, the cell 808a represents a dependency of App2 on App1 and the cell 810a represents a dependency of App5 on App2. Since App5 depends on App2 and App2 depends on App1. App5 also effectively depends on App1. Accordingly, the adjusted master data source matrix 900 includes an updated (with respect to the cell 812 in FIG. 8) value of one in a cell 902, to reflect the effective dependency of App5 on App1. Accordingly, based on the adjusted master data source matrix 900, if either App1 or App2 would like to block a master data object, App5 should be a responder, and a veto raised by App5 should prevent App1 and App5 from being able to block the master data object.

The adjusted master data source matrix 900 and the adjusted veto effect matrix 700 and the reflect inter-application dependencies (e.g., whether an application relies on another application for master data or whether an application receives transactional data from another application, respectively). The examples discussed above illustrate dependencies that are directed (e.g., a third application may depend on a second application and the second application may depend on a first application, in a processing chain). In some cases, however, cyclic dependencies (e.g., dependency loops and/or bidirectional dependencies). For instance, a third application might depend on a second application, and the second application might depend on the first application and the third application. In this example, a veto of the first application is relevant for all applications, a veto of the second application is relevant for the third application, and a veto of the third application is relevant for the second application. In some cases, cycles or loops can be represented in a matrix by population of cells (e.g., with a value of one) in a lower left region of a matrix (along with values populated in an upper right region of a matrix). A particular example of cyclic dependency is discussed below with respect to FIG. 10.

Figure 10:
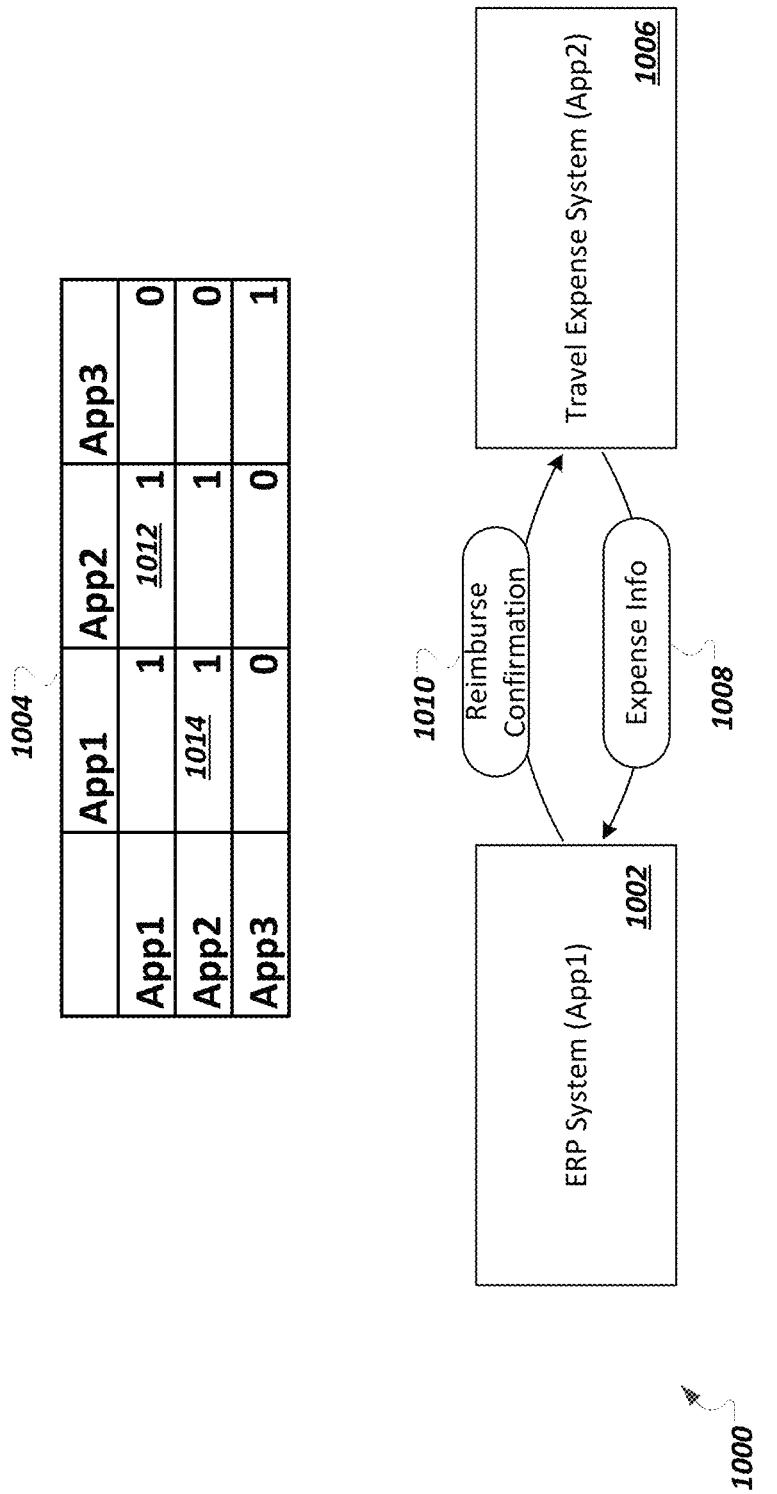
FIG. 10 illustrates an example system that includes cyclic dependency.

FIG. 10 illustrates an example system 1000 that includes cyclic dependency. An ERP (Enterprise Resource Planning) system 1002 (e.g., referred to as App1 in a veto effect matrix 1004) can include a financial module. A travel expense system 1006 (e.g., App2) may be used by employees for uploading of information regarding reimbursable trips, for example. The travel expense system 1006 can replicate certain expense information 1008 to the ERP system 1002 for posting in the financial module. The travel expense system 1006 can be configured to assume, for an expense record for an employee in the travel expense system 1006, that the ERP system 1002 has unblocked master data for the employee (e.g., otherwise an employee could record travel expenses which would never be processed for reimbursement). The ERP system 1002 can be configured to assume that the travel expense system 1006 maintains employee expense records in an unblocked state at least until a posting process is finished, so that the ERP system 1002 can send a reimbursement confirmation 1010 to the travel expense system 1006. A posting process can complete, for example, when money is paid out to an employee and the travel and expense system 1006 has received (and acknowledged) the reimbursement confirmation 1010. If the travel expense system 1006 would not acknowledge successful receipt of the reimbursement confirmation 1010 (e.g., due to the travel expense system 1006 prematurely blocking an expense record and thus not recognizing the reimbursement confirmation 1010) the ERP system 1002 may not deem the posting process as finished. In summary, both the ERP system 1002 and the travel expense system 1006 depend on receiving transactional data from one another and on the other system's capability of processing transactional data sent to the other system.

This cyclic dependency can be represented in the veto effect matrix 1004. For instance a cell 1012 represents that the ERP system 1002 (App1) replicates the reimbursement confirmation 1010 to the travel expense system 1006 (App2) and a cell 1014 represents that the travel expense system 1006 (App2) replicates the expense information 1008 to the ERP system 1002 (App1). Accordingly, the iEoP protocol performed in an enhanced mode using the veto effect matrix 1004 can ensure that if either App1 or App2 can block an object, a veto by the other of App1 or App2 can prevent the object from being blocked in the other application.

Figure 11:
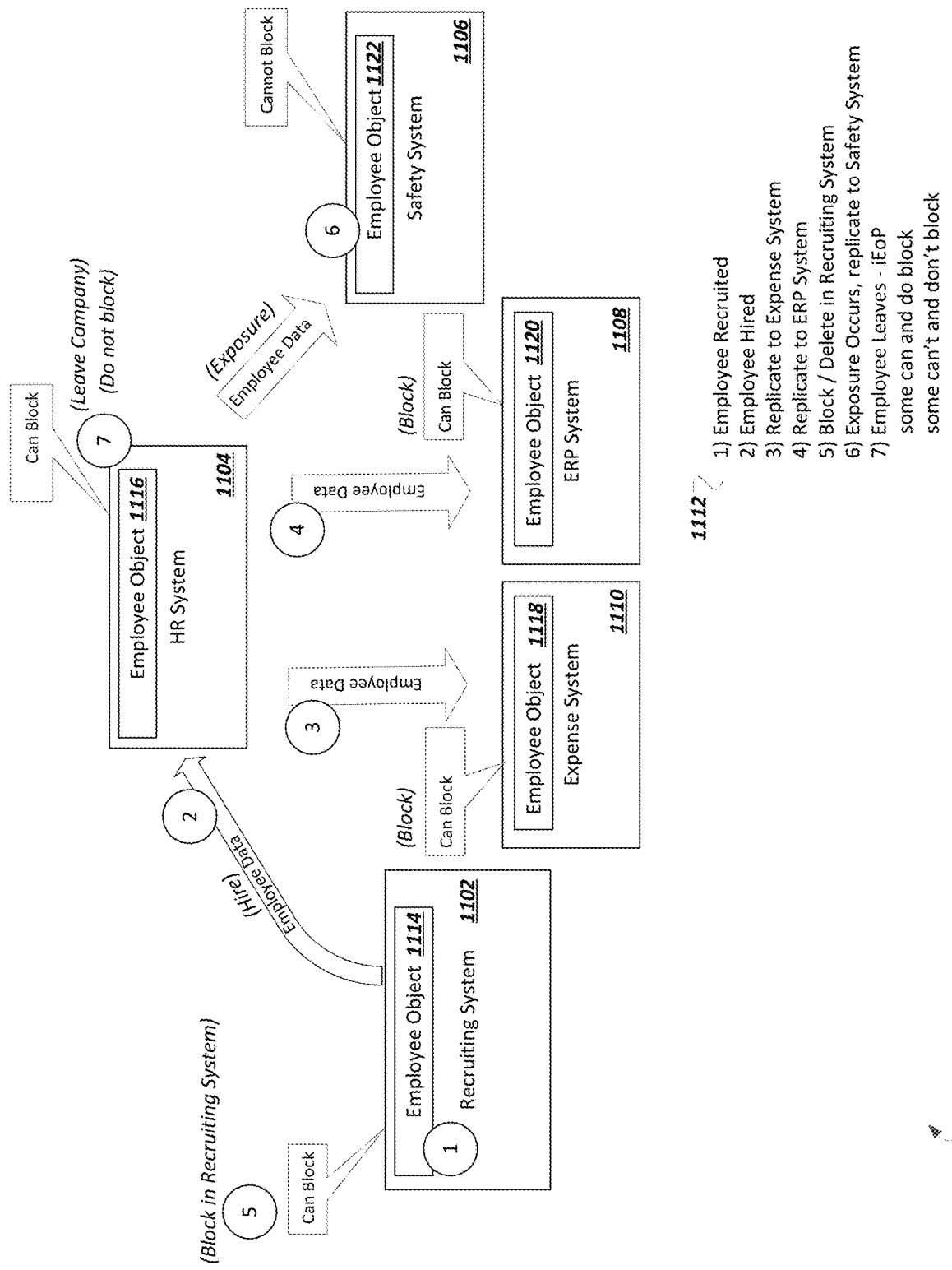
FIG. 11 illustrates an example landscape in which an enhanced integrated end-of-purpose protocol is performed in light of different inter-application dependencies

FIG. 11 illustrates an example landscape 1100 in which an enhanced iEoP protocol is performed in light of different inter-application dependencies. The landscape 1100 includes a recruiting system 1102, a human resources system 1104, a safety system 1106 (e.g., health and safety system), an ERP system 1108, and an expense system 1110 (e.g., travel and expense system). Different processing can occur with respect to employee data in different systems, based on inter-application dependencies. Phases are illustrated as circled numbers. A summary of phases is displayed in a legend 1112.

In a first phase, a recruiting system is used to collect master data 1114 for a candidate employee. In a second phase, an employee contract is signed, the candidate employee is hired, and master data for the employee is replicated from the recruiting system 1102 to the human resources system 1104 (and stored as employee data 1116). In a third phase, employee master data is replicated from the human resources system 1104 to the expense system 1110 (and stored as employee data 1118). In a fourth phase (which may be performed in conjunction with (e.g., substantially parallel with) the third phase), employee master data is replicated from the human resources system 1104 to the ERP system 1108 (and stored as employee data 1120). The recruiting system 1102 does not have a need to store candidate employee master data indefinitely, so at some point during the employee's employment, in a fifth phase, the recruiting system 1102 determines that it can block the master data, and an iEoP ticket can be created and the recruiting system 1102 can vote can-block 1122. As described above, and based on configurations in a veto effect matrix, a determination can be made, although other applications may raise veto votes for this run of the iEoP protocol, that those veto votes are not relevant to whether the recruiting system can block the master data for the employee (e.g., as indicated in the veto effect matrix, no system creates transactional data that is replicated to the recruiting system 1102). Accordingly, in phase five, the recruiting system 1102 blocks (and eventually deletes) the employee master data in the recruiting system 1102.

In a sixth phase, the employee is exposed to potentially dangerous substances in a context of work for the employer. Accordingly, master data (or at least a master data pointer, such as employee identifier) is replicated from the human resources system 1104 to the safety system and stored as employee master data 1122. For example, in some cases, the safety system 1106 does not store information for all employees but only for employees who have had a safety incident. In other examples, employee object identifiers are replicated from the human resources system 1104 to the safety system 1106 when the employee is hired (and then only associated with safety incident information when a safety incident actually occurs). A residence period for incident records in the safety system may be particularly long (e.g., twenty years) due to potential long-term health effects from certain exposures. As another example, a health effect may not manifest itself until a relatively long time after exposure, and safety administrators may want to retain exposure information for a long time to enable correlating a safety incident with a disease that manifests for an employee (or formerly employee) some years after exposure.

In a seventh phase (perhaps some years after the exposure but before a residence period for the incident record of the employee expires, the employee leaves the company. Accordingly, at some point the human resources system can determine that the employee master data can be blocked in the human resources system 1104 (e.g., the human resources system 1104 may not leave former employee data unblocked indefinitely). Accordingly, an iEoP protocol run can be initiated for the employee master data. The human resources system 1104, the ERP system 1108, and the expense system 1110 can each vote can-block. However, the safety system 1106 can vote cannot-block. Accordingly, and based on dependency information in a master data source matrix, the DPI service can determine that the human resource system 1104 should not block the employee data 1116. That is, the safety system 1106 relies on the human resources system 1104 for having certain master data information as long as a pseudonymous identifier such as an employee number is present in the safety system 1106. Therefore, the safety system 1106 assumes and expects that its veto results in the human resource system does not block (or at least does not destruct) the employee master data object.

However, neither the master data source matrix nor the veto effect matrix may have dependency information that indicates the ERP system 1108 or the expense system should not block the employee master data. Accordingly, the employee master data can be blocked in those systems.

Figure 12:
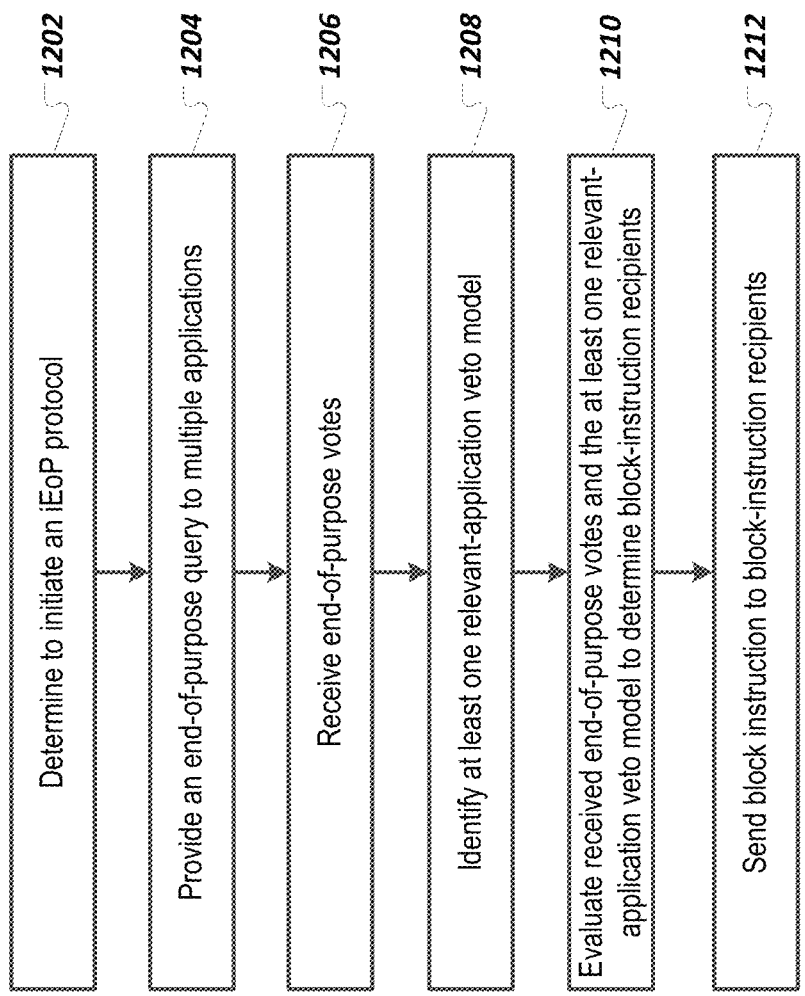
FIG. 12 is a flowchart of an example method for semantic responder dependencies in integrated end-of-purpose protocols.

FIG. 12 is a flowchart of an example method 1200 for semantic responder dependencies in integrated end-of-purpose protocols. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more components of the system 100 described above with respect to FIG. 1. For example, the method 1200 and related methods can be executed by the server 102 of FIG. 1.

At 1202, a determination is made, in a multi-application landscape that includes multiple applications, to initiate an integrated end-of-purpose protocol for an object. The object can be a master data object that represents a data subject.

At 1204, an end-of-purpose query is provided to different applications of the multiple applications that requests a respective application to determine whether the respective application is able to block the object.

At 1206, an end-of-purpose vote from each application of the different applications is received, in response to the end-of-purpose query. Each end-of-purpose vote is either a can-block vote that indicates that the application can block the object or a veto vote that indicates that the application cannot block the object.

At 1208, at least one relevant-application veto model is identified. Relevant-application veto models can include a veto effect model and/or a master data source model. Relevant-application veto models model which applications can raise a relevant veto vote with respect to another application. Relevant-application veto models can be represented as matrices, as directed graphs, or as some other type of model.

The veto effect model indicates which applications replicate transactional data to other applications. That is, the veto effect model represents dependencies between applications with respect to replication of transactional data that references master data. The master data source model models which applications refer to master data in another application. That is, the master data source model represents master data dependencies between applications.

At 1210, received end-of-purpose votes and the at least one relevant-application veto model are evaluated to determine whether any applications should be block instruction recipients. For example, a determination can be made that a first application can block the object and that no application has provided a relevant veto vote relevant to the first application. Accordingly, the first application can be identified as a block instruction recipient.

At 1212, if any block instructions recipients have been identified, a block instruction for the object is sent to each block instruction recipient. Further to the above example, the block instruction for the object first can be sent to the first application, even if a second application has provided a veto vote not relevant to the first application.

Other implementations from those described above can include other features. For instance, the matrices described above generally represent one-to-one relations between systems. Other implementations can use a more complex rule base approach. With rules, combinations or conditions are possible to be defined such "a veto against blocking in App1 is only valid if App2 and (App3 or App4) but not App5 provides a veto". Such kind of rules can be defined and maintained as Boolean expressions, for example. Rule-based capability can thus address additional situations that might not easily be represented in matrices. Rules can be an alternative to matrix-based approaches, but in some implementations some or all rules can be integrated into a matrix by one or more of 1) enabling matrix cells to include certain expressions; exchanging a full matrix column or row with an expression; or merging some cells in the matrix and including an expression in a merged cell.

In some cases, an expression can include references to external functions that can be invoked that can consider other factors into account that are not part of local veto decisions of respective applications but can enhance local decisions with external information to determine relevancy of a vote. For instance, a veto of App3 against App1 might be considered relevant if a return value of a current-date function indicates a current date is within a first quarter of the year.

As another example, some implementations may factor a person who triggered the iEoP protocol execution in a requester application or the requester application itself in a rule definition. For instance, as a first example, a rule can be defined such that if a specific application triggers the iEoP protocol for an object involving a list of responders, then a certain responder will not receive a block work package, but if another requester triggers the protocol, all applications might be involved in the blocking phase. As a second example, a human administrator (or effective technical user) and/or a role of who initiates the protocol may be considered during rule evaluation. For instance, a rule can specify that when a senior data protection specialist triggers the execution of an iEoP protocol by a specific requesting application, all responder applications may receive the block work package, but if a junior data protection specialist triggers the protocol by that requesting application, then a specific application may be excluded from the block phase.

As another example, matrix approaches can be enhanced by enabling cell values other than zero or one. For instance, a number value in a cell can represent a priority or relevance of a veto with respect to the two applications associated with the cell. Priority values can be used to optimize responder groups and/or allow a flexible generation of responder groups based on the numbers in the matrix and on which application is a requesting application.

In some implementations, differences in semantics of blocking can exist between processing for transactional data matrices and for master data matrices. For instance, for transactional data matrices, a presence of a veto by a given application can have a result in that data is not blocked in relevant applications. For master data matrices, however, a veto by a given application can have a result that the data is not physically destructed in relevant applications (although data may be allowed to be blocked in such applications). For example, a relevant application may be allowed to block an object if other processing or configurations ensure that: 1) the data is not destructed in the application and can be viewed with appropriate authorizations; and 2) if there are updates to the object (e.g., made by an authorized user) these updates can be replicated to applications that rely on the application as a master data source.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising:
determining, in a multi-application landscape that includes multiple applications, to initiate an integrated end-of-purpose protocol for an object;
providing, to different applications of the multiple applications, an end-of-purpose query that requests a respective application to determine whether the respective application is able to block the object;
receiving, in response to the end-of-purpose query, an end-of-purpose vote from each application of the different applications, wherein each end-of-purpose vote is either a can-block vote that indicates that the application can block the object or a veto vote that indicates that the application cannot block the object;
identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application;
evaluating received end-of-purpose votes and the at least one relevant-application veto model to determine whether any applications should be block instruction recipients; and
if any block instructions recipients have been identified, sending a block instruction for the object to each block instruction recipient.

Example 2. The computer-implemented method of Example 1, wherein the object is a master data object.

Example 3. The computer-implemented method of any of the preceding examples, wherein the master data object represents a data subject.

Example 4. The computer-implemented method of any of the preceding examples, wherein relevant-application veto models are represented as matrices.

Example 5. The computer-implemented method of any of the preceding examples, wherein relevant-application veto models are represented as directed graphs.

Example 6. The computer-implemented method of any of the preceding examples, wherein the veto effect model represents dependencies between applications with respect to replication of transactional data that references master data.

Example 7. The computer-implemented method of any of the preceding examples, wherein the master data source model represents master data dependencies between applications.

Example 8. The computer-implemented method of any of the preceding examples, further comprising updating each of the at least one relevant-application veto model to reflect transitive application dependencies.

Example 9. The computer-implemented method of any of the preceding examples, wherein determining to initiate the integrated end-of-purpose protocol comprises receiving a request to initiate the integrated end-of-purpose protocol from a requesting application that can block the object; and wherein the method further comprises:
- determining, using the at least one relevant-application veto model, relevant applications for which a veto vote may be relevant to the requesting application; and
- providing the end-of-purpose query to the relevant applications and the requesting application and not to other applications of the multiple applications.

Example 10. The computer-implemented method of any of the preceding examples, wherein evaluating received end-of-purpose votes and the at least one relevant application veto model comprises:
- determining that a first application can block the object; and
- determining that no application has provided a relevant veto vote relevant to the first application.

Example 11. The computer-implemented method of any of the preceding examples, wherein determining whether any applications should be block-instruction recipients comprises identifying the first application as a block-instruction recipient for the object based on the first application being able to block the object and no applications having provided a relevant veto vote relevant to the first application.

Example 12. The computer-implemented method of any of the preceding examples, wherein sending a block instruction for the object to each block instruction recipient comprises sending the block instruction to the first application.

Example 13. The computer-implemented method of any of the preceding examples, wherein the first application is identified as a block instruction recipient for the object after a second application has provided a veto vote that is not relevant to the first application.

Example 14. The computer-implemented method of any of the preceding examples, wherein evaluating the received end-of-purpose votes and the master data source model comprises:
- identifying a veto vote for a first master data object received by a first application; and
- determining that the first veto vote is relevant to a second application in that the first application is requesting the second application to not physically destruct the first master data object;

and wherein the method further comprises:
- identifying the second application as a block instruction recipient; and
- configuring the second application to prevent physical destruction of the first master data object for at least as long as the first application continues to provide a veto vote for the first master data object.

Example 15. The computer-implemented method of any of the preceding examples, wherein the first master data object is updated while in a blocked state based on at least one update provided by a user authorized to update blocked objects in the second application.

Example 16. The computer-implemented method of any of the preceding examples, further comprising replicating an updated version of the first master data object from the second application to the first application.

Example 17. A system comprising:
one or more computers; and
a computer-readable medium coupled to the one or more computers having instructions stored thereon which, when executed by the one or more computers, cause the one or more computers to perform operations comprising:
- determining, in a multi-application landscape that includes multiple applications, to initiate an integrated end-of-purpose protocol for an object;
- providing, to different applications of the multiple applications, an end-of-purpose query that requests a respective application to determine whether the respective application is able to block the object;
- receiving, in response to the end-of-purpose query, an end-of-purpose vote from each application of the different applications, wherein each end-of-purpose vote is either a can-block vote that indicates that the application can block the object or a veto vote that indicates that the application cannot block the object;
- identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application;
- evaluating received end-of-purpose votes and the at least one relevant-application veto model to determine whether any applications should be block instruction recipients; and
- if any block instructions recipients have been identified, sending a block instruction for the object to each block instruction recipient.

Example 18. The system of Example 17, wherein the veto effect model represents dependencies between applications with respect to replication of transactional data that references master data.

Example 19. A computer program product encoded on a non-transitory storage medium, the product comprising non-transitory, computer readable instructions for causing one or more processors to perform operations comprising:
- determining, in a multi-application landscape that includes multiple applications, to initiate an integrated end-of-purpose protocol for an object;
- providing, to different applications of the multiple applications, an end-of-purpose query that requests a respective application to determine whether the respective application is able to block the object;
- receiving, in response to the end-of-purpose query, an end-of-purpose vote from each application of the different applications, wherein each end-of-purpose vote is either a can-block vote that indicates that the application can block the object or a veto vote that indicates that the application cannot block the object;
- identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application;

evaluating received end-of-purpose votes and the at least one relevant-application veto model to determine whether any applications should be block instruction recipients; and if any block instructions recipients have been identified, sending a block instruction for the object to each block instruction recipient.

Example 20. The computer program product of Example 19, wherein the veto effect model represents dependencies between applications with respect to replication of transactional data that references master data.

What is claimed is:

1. A computer-implemented method comprising:
   determining, in a multi-application landscape that includes multiple applications, to initiate an integrated end-of-purpose protocol for an object;
   providing, to different applications of the multiple applications, an end-of-purpose query that requests a respective application to determine whether the respective application is able to block the object;
   receiving, in response to the end-of-purpose query, an end-of-purpose vote from each application of the different applications, wherein each end-of-purpose vote is either a can-block vote that indicates that the application can block the object or a veto vote that indicates that the application cannot block the object;
   identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application;
   evaluating received end-of-purpose votes and the at least one relevant-application veto model to determine whether any applications should be block instruction recipients; and
   if any block instructions recipients have been identified, sending a block instruction for the object to each block instruction recipient.

2. The computer-implemented method of claim 1, wherein the object is a master data object.

3. The computer-implemented method of claim 2, wherein the master data object represents a data subject.

4. The computer-implemented method of claim 1, wherein relevant-application veto models are represented as matrices.

5. The computer-implemented method of claim 1, wherein relevant-application veto models are represented as directed graphs.

6. The computer-implemented method of claim 1, wherein the veto effect model represents dependencies between applications with respect to replication of transactional data that references master data.

7. The computer-implemented method of claim 1, wherein the master data source model represents master data dependencies between applications.

8. The computer-implemented method of claim 1, further comprising updating each of the at least one relevant-application veto model to reflect transitive application dependencies.

9. The computer-implemented method of claim 1, wherein determining to initiate the integrated end-of-purpose protocol comprises receiving a request to initiate the integrated end-of-purpose protocol from a requesting application that can block the object; and wherein the method further comprises:
   determining, using the at least one relevant-application veto model, relevant applications for which a veto vote may be relevant to the requesting application; and
   providing the end-of-purpose query to the relevant applications and the requesting application and not to other applications of the multiple applications.

10. The computer-implemented method of claim 1, wherein evaluating received end-of-purpose votes and the at least one relevant application veto model comprises:
    determining that a first application can block the object; and
    determining that no application has provided a relevant veto vote relevant to the first application.

11. The computer-implemented method of claim 10, wherein determining whether any applications should be block-instruction recipients comprises identifying the first application as a block-instruction recipient for the object based on the first application being able to block the object and no applications having provided a relevant veto vote relevant to the first application.

12. The computer-implemented method of claim 11, wherein sending a block instruction for the object to each block instruction recipient comprises sending the block instruction to the first application.

13. The computer-implemented method of claim 11, wherein the first application is identified as a block instruction recipient for the object after a second application has provided a veto vote that is not relevant to the first application.

14. The computer-implemented method of claim 1, wherein evaluating the received end-of-purpose votes and the master data source model comprises:
    identifying a veto vote for a first master data object received by a first application; and
    determining that the first veto vote is relevant to a second application in that the first application is requesting the second application to not physically destruct the first master data object;
    and wherein the method further comprises:
    identifying the second application as a block instruction recipient; and
    configuring the second application to prevent physical destruction of the first master data object for at least as long as the first application continues to provide a veto vote for the first master data object.

15. The computer-implemented method of claim 14, wherein the first master data object is updated while in a blocked state based on at least one update provided by a user authorized to update blocked objects in the second application.

16. The computer-implemented method of claim 15, further comprising replicating an updated version of the first master data object from the second application to the first application.

17. A system comprising:
    one or more computers; and
    a computer-readable medium coupled to the one or more computers having instructions stored thereon which, when executed by the one or more computers, cause the one or more computers to perform operations comprising:

determining, in a multi-application landscape that includes multiple applications, to initiate an integrated end-of-purpose protocol for an object;

providing, to different applications of the multiple applications, an end-of-purpose query that requests a respective application to determine whether the respective application is able to block the object;

receiving, in response to the end-of-purpose query, an end-of-purpose vote from each application of the different applications, wherein each end-of-purpose vote is either a can-block vote that indicates that the application can block the object or a veto vote that indicates that the application cannot block the object;

identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application;

evaluating received end-of-purpose votes and the at least one relevant-application veto model to determine whether any applications should be block instruction recipients; and if any block instructions recipients have been identified, sending a block instruction for the object to each block instruction recipient.

18. The system of claim 17, wherein the veto effect model represents dependencies between applications with respect to replication of transactional data that references master data.

19. A computer program product encoded on a non-transitory storage medium, the product comprising non-transitory, computer readable instructions for causing one or more processors to perform operations comprising:

determining, in a multi-application landscape that includes multiple applications, to initiate an integrated end-of-purpose protocol for an object;

providing, to different applications of the multiple applications, an end-of-purpose query that requests a respective application to determine whether the respective application is able to block the object;

receiving, in response to the end-of-purpose query, an end-of-purpose vote from each application of the different applications, wherein each end-of-purpose vote is either a can-block vote that indicates that the application can block the object or a veto vote that indicates that the application cannot block the object;

identifying at least one relevant-application veto model, wherein relevant-application veto models include a veto effect model and a master data source model that model which applications can raise a relevant veto vote with respect to another application, wherein the veto effect model indicates which applications replicate transactional data to other applications and the master data source model indicates which applications refer to master data in another application;

evaluating received end-of-purpose votes and the at least one relevant-application veto model to determine whether any applications should be block instruction recipients; and if any block instructions recipients have been identified, sending a block instruction for the object to each block instruction recipient.

20. The computer program product of claim 19, wherein the veto effect model represents dependencies between applications with respect to replication of transactional data that references master data.

\* \* \* \* \*